US012677221B2

(12) United States Patent
 Knudsen et al.

(10) Patent No.: US 12,677,221 B2
(45) Date of Patent: Jul. 7, 2026

(54) USER DEVICE AND NETWORK NODE FOR WIRELESS COMMUNICATION NETWORK, AND OPERATION METHODS THEREFOR

(71) Applicant: NOKIA TECHNOLOGIES OY, Espoo (FI)

(72) Inventors: Knud Knudsen, Aabybro (DK); Mads Lauridsen, Gistrup (DK); Jan Torst Hviid, Klarup (DK); Daniela Laselva, Klarup (DK); Kari Juhani Hooli, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 237 days.

(21) Appl. No.: 18/477,217

(22) Filed: Sep. 28, 2023

(65) Prior Publication Data
 US 2024/0114457 A1     Apr. 4, 2024

(30) Foreign Application Priority Data
 Sep. 30, 2022     (FI) ...................................... 20225883

(51) Int. Cl.
 *H04W 52/02*          (2009.01)

(52) U.S. Cl.
 CPC ... *H04W 52/0235* (2013.01); *H04W 52/0216* (2013.01)

(58) Field of Classification Search
 CPC ......... H04W 52/0216; H04W 52/0235; H04W 76/28; H04W 72/231; H04W 48/12; H04W 60/04; H04W 68/005; Y02D 30/70
 See application file for complete search history.

(56) References Cited

U.S. PATENT DOCUMENTS

| | | | |
|---|---|---|---|
| 2018/0310198 A1 | 10/2018 | Zhou et al. | |
| 2020/0045631 A1 | 2/2020 | Vyas et al. | |
| 2023/0021160 A1 * | 1/2023 | Lee ................... | H04W 56/0015 |

FOREIGN PATENT DOCUMENTS

| | | | | |
|---|---|---|---|---|
| CN | 109392050 B | * | 7/2020 | ......... H04W 52/028 |
| WO | 2018204908 A1 | | 11/2018 | |
| WO | 2022084546 A1 | | 4/2022 | |

OTHER PUBLICATIONS

"3rd Generation Partnership Project; Technical Specification Group Radio Access Network; NR; User Equipment (UE) procedures in Idle mode and RRC Inactive state (Release 17)", 3GPP TS 38.304, V17.1.0, Jun. 2022, pp. 1-50.

(Continued)

*Primary Examiner* — Jianye Wu
(74) *Attorney, Agent, or Firm* — Lippes Mathias LLP

(57)          ABSTRACT

The present disclosure relates to a simple and power-efficient procedure that allows using wake-up signaling in inter-cell mobility scenarios. The procedure is based on configuring a Wake-Up Signal (WUS) Beacon Occasion (WBO) for each Tracking Area (TA) of a user device. A WUS beacon corresponding to each cell in the TA is transmitted once at a cell-specific time offset within the WBO. The WBO is configured together with a mapping table that maps each of the cell-specific time offsets to cell-specific information. The cell-specific information may comprise a cell ID and/or an indicator of a cell-specific frequency and/or cell-specific frequency range to be used for synchronization signal reception (e.g., Global Synchronization Channel Number (GSCN)). Each TA comprises intra-frequency cells only. By using the WBO, the user device may reduce its power consumption by avoiding switching from its sleep state to its active state when doing cell reselections in the TA.

16 Claims, 7 Drawing Sheets

S202 — Receiving a Wake-Up Signal (WUS) Beacon Occasion (WBO) configuration for a current Tracking Area (TA), the current TA comprising a set of intra-frequency cells each having an ID, and the WBO configuration comprising: a periodicity of a WBO, a set of time multiplexed WUS beacons within the WBO, and a mapping table that maps each of the cell-specific time offsets to the ID of one cell of the set of intra-frequency cells of the current TA S204 — When the user device is in a sleep state in the current TA, monitoring a reception (RX) level and/or quality of each WUS beacon of the set of WUS beacons in the current TA S206 — Based on the monitored RX levels and/qualities, determining whether the user device is within the current TA and whether to switch between different WUS beacons of the set of WUS beacons in the current TA, while remaining in the sleep state

200

(56) References Cited

OTHER PUBLICATIONS

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.
"3rd Generation Partnership Project; Technical Specification Group Radio Access Network; Study on support of reduced capability NR devices (Release 17)", 3GPP TR 38.875, V17.0.0, Mar. 2021, pp. 1-135.
"New SID: Study on low-power Wake-up Signal and Receiver for NR", 3GPP TSG RAN meeting #94e, RP-213645, Agenda Item: 8A.1, vivo, Dec. 6-17, 2021, 4 pages.
"Motivation for new study item on ultra-low power wake up signal in Rel-18", 3GPP TSG RAN Rel-18 workshop, RWS-210168, Agenda Item: 4.3, vivo, Jun. 28-Jul. 2, 2021, 14 pages.
"3rd Generation Partnership Project; Technical Specification Group Radio Access Network; Evolved Universal Terrestrial Radio Access (E-UTRA); User Equipment (UE) procedures in idle mode (Release 17)", 3GPP TS 36.304, V17.0.0, Mar. 2022, pp. 1-65.

"3rd Generation Partnership Project; Technical Specification Group Services and System Aspects; Procedures for the 5G System (5GS); Stage 2 (Release 17)", 3GPP TS 23.502, V17.5.0, Jun. 2022, pp. 1-744.
"3rd Generation Partnership Project; Technical Specification Group Core Network and Terminals; Non-Access-Stratum (NAS) protocol for 5G System (5GS); Stage 3; (Release 17)", 3GPP TS 24.501, V17.7.1, Jun. 2022, pp. 1-991.
"IEEE 802.11", wikipedia, Retrieved on Aug. 31, 2025, Webpage available at: https://en.wikipedia.org/wiki/IEEE_802.11.
Office action received for corresponding European Patent Application No. 23195374.6, dated Aug. 1, 2025, 8 pages.
Office Action and Search Report for Finnish Application No. 20225883, mailed on Feb. 16, 2023, 13 pages.
3GPP TSG RAN meeting #97e, RP-222644 (revision of RP-221271); "Revised SID: Study on low-power Wake-up Signal and Receiver for NR"; Source: Vivo; Agenda Item: 9.2.9; Electronic Meeting; Sep. 12-16, 2022; 11 pages.
Extended European Search Report for European Patent Application No. 23195374.6. mailed on Mar. 11, 2024, 11 pages.

* cited by examiner

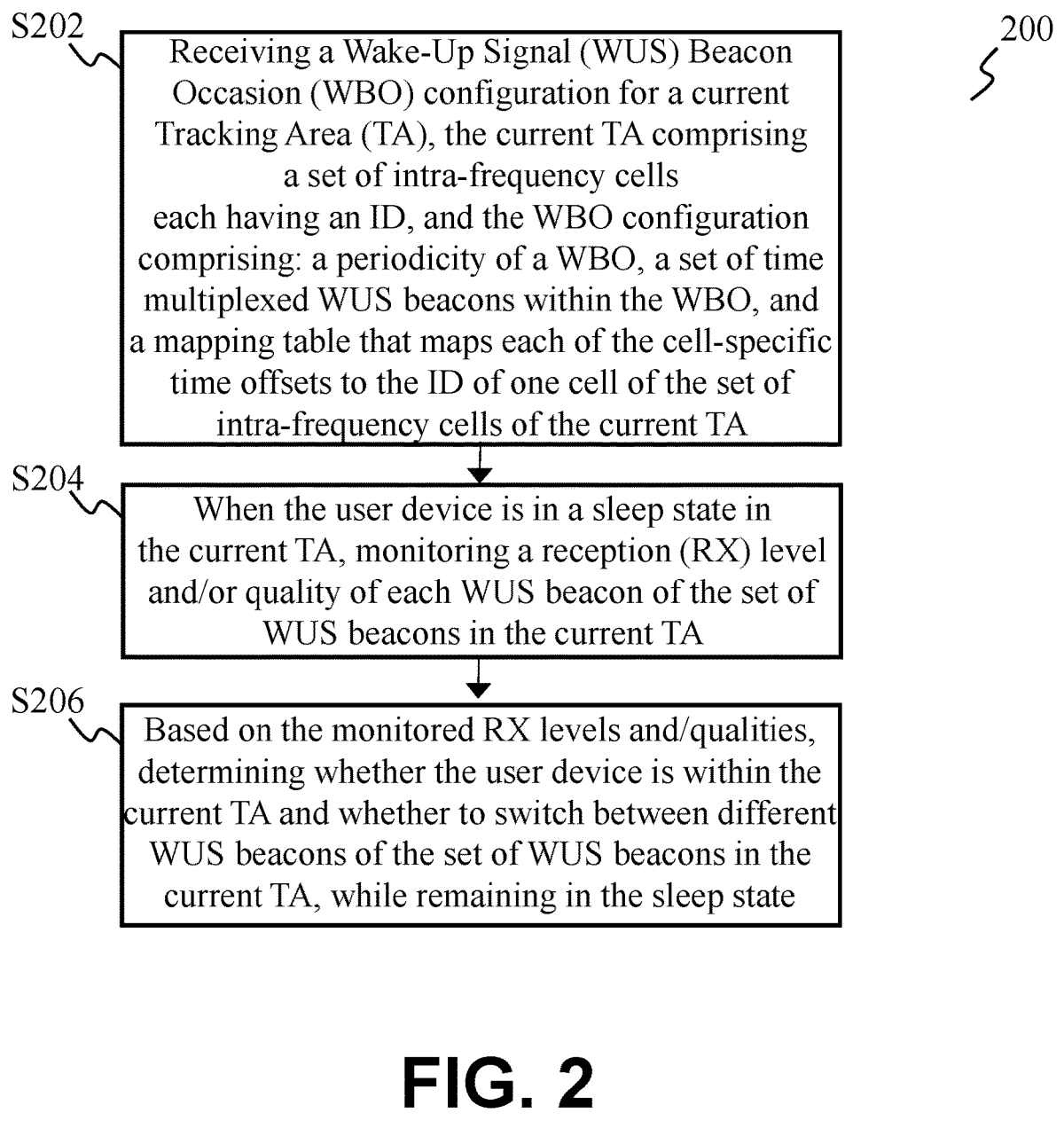

S202

200

Receiving a Wake-Up Signal (WUS) Beacon
Occasion (WBO) configuration for a current
Tracking Area (TA), the current TA comprising
a set of intra-frequency cells
each having an ID, and the WBO configuration
comprising: a periodicity of a WBO, a set of time
multiplexed WUS beacons within the WBO, and
a mapping table that maps each of the cell-specific
time offsets to the ID of one cell of the set of
intra-frequency cells of the current TA

S204

When the user device is in a sleep state in
the current TA, monitoring a reception (RX) level
and/or quality of each WUS beacon of the set of
WUS beacons in the current TA

S206

Based on the monitored RX levels and/qualities,
determining whether the user device is within the
current TA and whether to switch between different
WUS beacons of the set of WUS beacons in the
current TA, while remaining in the sleep state

FIG. 2

All beacons are time-multiplexed on the same frequency within a TA

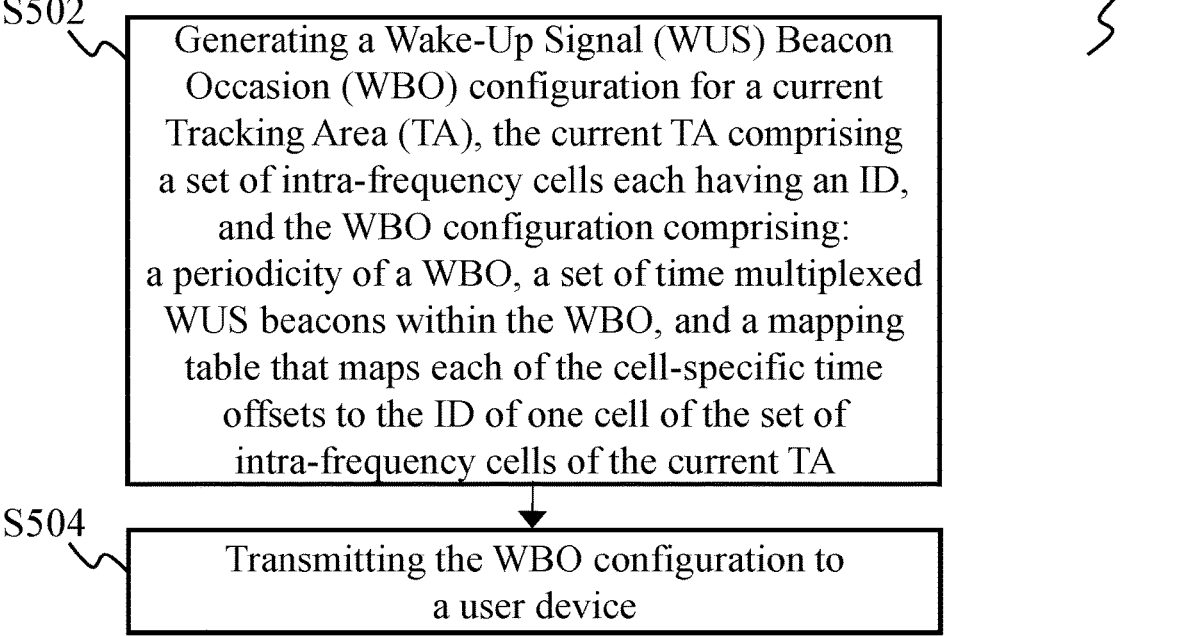

S502

Generating a Wake-Up Signal (WUS) Beacon
Occasion (WBO) configuration for a current
Tracking Area (TA), the current TA comprising
a set of intra-frequency cells each having an ID,
and the WBO configuration comprising:
a periodicity of a WBO, a set of time multiplexed
WUS beacons within the WBO, and a mapping
table that maps each of the cell-specific time
offsets to the ID of one cell of the set of
intra-frequency cells of the current TA

S504

Transmitting the WBO configuration to
a user device

WBO for TA1

| Beacon index | 1 | 2 | 3 | 4 | 5 | 6 | 7 |
|---|---|---|---|---|---|---|---|
| Cell ID | 1 | 2 | 5 | 6 | 7 | 11 | 12 |

WBO for TA2

| Beacon index | 1 | 2 | 3 | 4 | 5 | 6 | 7 |
|---|---|---|---|---|---|---|---|
| Cell ID | 3 | 4 | 8 | 9 | 10 | 13 | 14 |

USER DEVICE AND NETWORK NODE FOR WIRELESS COMMUNICATION NETWORK, AND OPERATION METHODS THEREFOR

PRIORITY

This application claims priority to Finnish Application No. 20225883, filed on Sep. 30, 2022, entitled "USER DEVICE AND NETWORK NODE FOR WIRELESS COMMUNICATION NETWORK, AND OPERATION METHODS THEREFOR", the entirety of which is hereby incorporated by reference.

TECHNICAL FIELD

The present disclosure relates to the field of wireless communications, and more particularly to a user device and a network node both so configured as to enhance power consumption of the user device by using wake-up signaling in inter-cell mobility scenarios, as well as to corresponding methods for operating the user device and the network node.

BACKGROUND

As the number of different communication services requiring User Equipments (UEs) to be connected to a wireless communication network is growing up from day to day, power consumption caused by using the communication services in the UEs is increasing as well. For this reason, UE manufacturers always give much attention to seeking for solutions allowing the power consumption to be reduced. This is especially important for those UEs which use small rechargeable and non-rechargeable batteries (e.g., different sensors and actuators that are deployed extensively for monitoring, measuring, charging and other tasks, as well as wearable devices including smart watches, rings, eHealth related devices, and medical monitoring devices). Furthermore, some of these UEs not only require a long battery life, but also require latency-critical services (e.g., fire detection and extinguishing sensors). Therefore, the previously proposed Discontinuous Reception (DRX) solutions (e.g., extended DRX (eDRX) that allows extending a periodicity by which a UE wakes up to monitor for paging, which in turn reduces average power consumption) are not applicable as they would lead to unacceptable communication latency.

Currently, a network node triggers a UE to wake-up exactly when needed in an event-driven manner, by transmitting a special Wake-Up Signal (WUS) to the UE, which is monitored by a dedicated low-power WUS receiver at the UE. When the UE receives the WUS, the WUS receiver can trigger the wake-up of an ordinary transceiver, whereupon intensive data exchange between the network node and the UE can start. Thus, if there is no WUS, the transceiver is in an OFF-state or kept in a deep sleep mode. In turn, the WUS receiver can be operated in an always 'ON' manner, while consuming significantly less power compared to the transceiver.

According to the existing WUS-based paging procedure, a WUS towards a UE is only sent by a network node in a cell in which the UE has most recently entered RRC_IDLE state. This means that if the UE in RRC_IDLE state reselects from the last cell to another cell, then it shall not assume to be paged with the WUS. This is because the existing paging procedure does not support wake-up signaling in inter-cell mobility scenarios. Given this, the UE will have to turn on its transceiver after the cell reselection, hence increasing its power consumption.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows wake-up signaling to be efficiently used in inter-cell mobility scenarios.

The objective above is achieved by the features of the independent claims in the appended claims. Further embodiments and examples are apparent from the dependent claims, the detailed description and the accompanying drawings.

According to a first aspect, a user device is provided. The user device comprises at least one processor and at least one memory. The at least one memory comprises a computer program code. The at least one memory and the computer program code are configured to, with the at least one processor, cause the user device to operate at least as follows. At first, the user device receives a WUS Beacon Occasion (WBO) configuration for a current Tracking Area (TA). The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO, and the mapping table maps each of the cell-specific time offsets to the ID of one cell of the set of intra-frequency cells of the current TA. When the user device is in a sleep state (e.g., RRC_IDLE, RRC_INACTIVE, or DRX state) in the current TA, it starts monitoring a reception (RX) level and/or RX quality of each WUS beacon of the set of WUS beacons in the current TA. By using the monitored RX levels and/or RX qualities, the user device determines whether it is still within the current TA and whether to switch between different WUS beacons of the set of WUS beacons in the current TA, while remaining in the sleep state. By so doing, the user device may reduce its power consumption by avoiding switching from the sleep state to the active state (i.e., turning on its ordinary transceiver) when doing cell reselections in the current TA. For example, if the user device determines that the set of WUS beacons comprises another WUS beacon better (in terms of the RX level and/or quality) than the WUS beacon previously used by the user device, it may switch to said another WUS beacon while remaining in the sleep state. Said switching will in turn mean reselection from the last cell to another (neighbouring) cell within the TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its Local Oscillator (LO) frequently, which allows the user device to additionally reduce its average power consumption. On top of that, since the WUS beacons are time multiplexed in the WBO, they will not interfere with each other inside the current TA.

In one example embodiment of the first aspect, the at least one memory and the computer program code are further configured to, with the at least one processor, cause the user device to operate as follows. At first, the user device determines that the RX level monitored for each WUS beacon of the set of WUS beacons in the current TA is less than a threshold, and/or the RX quality monitored for each WUS beacon of the set of WUS beacons in the current TA is less than a threshold. Then, based on said determination, the user device detects that it is beyond the current TA, whereupon the operations indicated above for the current TA are performed by the user device but for a new TA comprising a set of intra-frequency cells each having an ID. Thus, if required, the user device may perform, while being in the sleep state, cell reselection not only within one TA, but also between different TAs. More specifically, the user device may detect that it moves outside its current TA when it is no longer able to receive any WUS beacon with a sufficient RX level and/or quality within the configured WBO. In this case, the user device may switch back to its active state (i.e. turn on its transceiver) and checks if cell reselection to a stronger serving cell is possible. A new WBO configuration may then be acquired from broadcasted system information or via dedicated signaling.

In one example embodiment of the first aspect, the WBO for the new TA is time shifted and/or frequency shifted from the WBO for the current TA. This may allow avoiding interferences between neighbouring TAs.

In one example embodiment of the first aspect, the at least one memory and the computer program code are further configured to, with the at least one processor, cause the user device to operate as follows. The user device receives, together with the WBO configuration for the current TA, a cell-optimized WBO configuration that comprises: at least one WUS beacon of the set of WUS beacons in the WBO configuration for the current TA, and at least one WUS beacon of a set of WUS beacon in a WBO configuration for at least one other TA. The at least one WUS beacon of the set of WUS beacons in the WBO configuration for each of the at least one other TA is time shifted from the at least one WUS beacon of the set of WUS beacons in the WBO configuration for the current TA. Then, the user device monitors a RX level and/or RX quality of each WUS beacon in the cell-optimized WBO configuration when the user device is in the sleep state. After that, the user device uses the monitored RX level and/or RX quality of each WUS beacon in the cell-optimized WBO configuration to decide whether to switch between different WUS beacons in the cell-optimized WBO configuration or to switch from the cell-optimized WBO configuration to the WBO configuration for the current TA and starts performing the above-indicated operations of the current TA. The benefit provided by the cell-optimized WBO configuration is that it may comprise the WUS beacons from the most relevant neighboring cells even if they are provided in different TAs. If the user device fails to detect proper (in terms of the RX level and/or quality) one or more WUS beacons within the cell-optimized WBO configuration, it may fall back to a WBO configuration for a certain TA (i.e., TA-specific WBO configuration).

In one example embodiment of the first aspect, the mapping table further maps each of the cell-specific time offsets to an indicator of a cell-specific frequency and/or cell-specific frequency range to be used by the user device to search for a synchronization signal. Together with the cell ID, this indicator may allow the user device to receive a synchronization signal (e.g., Synchronization Signal Block (SSB)) in a corresponding service cell in the TA without searching for it.

In one example embodiment of the first aspect, the indicator of the cell-specific frequency and/or cell-specific frequency range is configured as a Global Synchronization Channel Number (GSCN). The GSCN may allow the user device to determine the frequency of the synchronization signal (e.g., SSB) of the serving cell more quickly and efficiently.

In one example embodiment of the first aspect, the WBO configuration further comprises, for the set of WUS beacons, at least one of the following: an allocated subcarrier; a symbol offset, a slot offset and a frame offset; a symbol duration, a slot duration and a frame duration; and a frame periodicity. By using these additional parameters, the user device may easily find a time and/or frequency position of each WUS beacon within the WBO.

According to a second aspect, a network node is provided. The network node comprises at least one processor and at least one memory. The at least one memory comprises a computer program code. The at least one memory and the computer program code are configured to, with the at least one processor, cause the network node to operate at least as follows. At first, the network node defines a WBO configuration for a current TA of a user device. The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO. The mapping table maps each of the cell-specific time offsets to the ID of one cell of the set of intra-frequency cells of the current TA. After that, the network node transmits the WBO configuration to the user device. By using the WBO configuration, the network node may allow the user device to reduce its power consumption by avoiding switching from a sleep state to an active state (i.e., turning on the ordinary transceiver of the user device) when doing cell reselections in the current TA. For example, if the user device determines that the set of WUS beacons comprises another WUS beacon better (in terms of the RX level or quality) than the WUS beacon previously used by the user device, it may switch to said another WUS beacon while remaining in the sleep state. Said switching will in turn mean reselection from the last cell to another (neighbouring) cell within the current TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its LO frequently, which allows the user device to additionally reduce its average power consumption. On top of that, since the WUS beacons are time multiplexed in the WBO, they will not interfere with each other inside the current TA.

In one example embodiment of the second aspect, the at least one memory and the computer program code are further configured to, with the at least one processor, cause the network node to operate as follows. The network node defines, together with the WBO configuration for the current TA, a cell-optimized WBO configuration that comprises: at least one WUS beacon of the set of WUS beacons in the WBO configuration for the current TA, and at least one WUS beacon of a set of WUS beacon in a WBO configuration for at least one other TA. The at least one WUS beacon of the set of WUS beacons in the WBO configuration for each of the at least one other TA is time shifted from the at least one WUS beacon of the set of WUS beacons in the WBO configuration for the current TA. After that, the network node transmits, together with the WBO configuration for the current TA, the cell-optimized WBO configuration to the user device. The benefit provided by the cell-optimized WBO configuration is that it may comprise the WUS beacons from the most relevant neighboring cells even if they are provided in different TAs. If the user device fails to detect proper (in terms of the RX level and/or quality) one or more WUS beacons within the cell-optimized WBO configuration, it may fall back to a WBO configuration for a certain TA (i.e., TA-specific WBO configuration).

In one example embodiment of the second aspect, the mapping table further maps each of the cell-specific time offsets to an indicator of a cell-specific frequency and/or cell-specific frequency range to be used by the user device to search for a synchronization signal. Together with the cell ID, this indicator may allow the user device to receive a synchronization signal (e.g., SSB) in a corresponding service cell in the TA without searching for it.

In one example embodiment of the second aspect, the indicator of the cell-specific frequency and/or cell-specific frequency range is configured as a GSCN. The GSCN may allow the user device to determine the frequency of the synchronization signal (e.g., SSB) of the serving cell more quickly and efficiently.

In one example embodiment of the second aspect, the WBO configuration further comprises, for the set of WUS beacons, at least one of the following: an allocated subcarrier; a symbol offset, a slot offset and a frame offset; a symbol duration, a slot duration and a frame duration; and a frame periodicity. By sending these additional parameters in the WBO configuration, the network node may allow the user device to easily find a time and/or frequency position of each WUS beacon within the WBO.

According to a third aspect, a method for operating a user device is provided. The method starts with the step of receiving a WBO configuration for a current TA. The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO, and the mapping table maps each of the cell-specific time offsets to the ID of one cell of the set of intra-frequency cells of the current TA. After that, when the user device is in a sleep state in the current TA, the method goes on to the step of monitoring a RX level and/or RX quality of each WUS beacon of the set of WUS beacons in the current TA. Next, the method proceeds to the step of using the monitored RX levels and/or RX qualities to determine whether the user device is within the current TA and whether to switch between different WUS beacons of the set of WUS beacons in the current TA, while remaining in the sleep state. By so doing, the user device may reduce its power consumption by avoiding switching from the sleep state to the active state (i.e., turning on its ordinary transceiver) when doing cell reselections in the current TA. For example, if the user device determines that the set of WUS beacons comprises another WUS beacon better (in terms of the RX level and/or quality) than the WUS beacon previously used by the user device, it may switch to said another WUS beacon while remaining in the sleep state. Said switching will in turn mean reselection from the last cell to another (neighbouring) cell within the current TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its LO frequently, which allows the user device to additionally reduce its average power consumption. On top of that, since WUS beacons are time multiplexed in the WBO, they will not interfere with each other inside the current TA.

According to a fourth aspect, a method for operating a network node is provided. The method starts with the step of defining a WBO configuration for a current TA of a user device. The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO. The mapping table maps each of the cell-specific time offsets to the ID of one cell of the set of intra-frequency cells of the current TA. After that, the method proceeds to the step of transmitting the WBO configuration to the user device. By using the WBO configuration, the network node may allow the user device to reduce its power consumption by avoiding switching from a sleep state to an active state (i.e., turning on the ordinary transceiver of the user device) when doing cell reselections in the current TA. For example, if the user device determines that the set of WUS beacons comprises another WUS beacon better (in terms of the RX level and/or quality) than the WUS beacon previously used by the user device, it may switch to said another WUS beacon while remaining in the sleep state. Said switching will in turn mean reselection from the last cell to another (neighbouring) cell within the current TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its LO frequently, which allows the user device to additionally reduce its average power consumption. On top of that, since the WUS beacons are time multiplexed in the WBO, they will not interfere with each other inside the current TA.

According to a fifth aspect, a user device is provided. The user device comprises a means for receiving a WBO configuration for a current TA. The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO, and the mapping table maps each of the cell-specific time offsets to the ID of one cell of the set of intra-frequency cells of the current TA. The user device further comprises a means for monitoring a RX level and/or RX quality of each WUS beacon of the set of WUS beacons in the current TA when the user device is in a sleep state in the current TA. The user device further comprises a means for using the monitored RX levels and/or RX qualities to determine whether the user device is still within the current TA and whether to switch between different WUS beacons of the set of WUS beacons in the current TA, while remaining in the sleep state. By so doing, the user device may reduce its power consumption by avoiding switching from the sleep state to the active state (i.e., turning on its ordinary transceiver) when doing cell reselections in the current TA. For example, if the user device determines that the set of WUS beacons comprises another WUS beacon better (in terms of the RX level and/or quality) than the WUS beacon previously used by the user device, it may switch to said another WUS beacon while remaining in the sleep state. Said switching will in turn mean reselection from the last cell to another (neighbouring) cell within the current TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its Local Oscillator (LO) frequently, which allows the user device to additionally reduce its average power consumption. On top of that, since the WUS beacons are time multiplexed in the WBO, they will not interfere with each other inside the current TA.

According to a sixth aspect, a network node is provided. The network node comprises a means for defining a WBO configuration for a current TA of a user device. The current TA comprises a set of intra-frequency cells each having an ID. The WBO configuration comprises a periodicity of a WBO, a set of WUS beacons within the WBO, and a mapping table. Each WUS beacon of the set of WUS beacons has a cell-specific time offset within the WBO. The mapping table maps each of the cell-specific time offsets to the ID of one cell of the set of intra-frequency cells of the current TA. The network node further comprises a means for transmitting the WBO configuration to the user device. By using the WBO configuration, the network node may allow the user device to reduce its power consumption by avoiding switching from a sleep state to an active state (i.e., turning on the ordinary transceiver of the user device) when doing cell reselections in the current TA. For example, if the user device determines that the set of WUS beacons comprises another WUS beacon better (in terms of the RX level and/or quality) than the WUS beacon previously used by the user device, it may switch to said another WUS beacon while remaining in the sleep state. Said switching will in turn mean reselection from the last cell to another (neighbouring) cell within the current TA, since all the WUS beacons are cell-specific (via their time offsets within the WBO). Furthermore, since all the cells in the current TA are intra-frequency, i.e., use the same frequency for WUS beacon transmissions, the user device does not need to make any frequency changes (e.g., new frequency tuning) to observe the WUS beacon from said another cell. This in turn means that the user device does not need to re-tune its LO frequently, which allows the user device to additionally reduce its average power consumption. On top of that, since the WUS beacons are time multiplexed in the WBO, they will not interfere with each other inside the current TA.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which:

FIG. 2 shows a flowchart of a method for operating the user device of FIG. 1 in accordance with one example embodiment;

FIG. 5 shows a flowchart of a method for operating the network node of FIG. 10 in accordance with one example embodiment;

DETAILED DESCRIPTION

Figure 1:
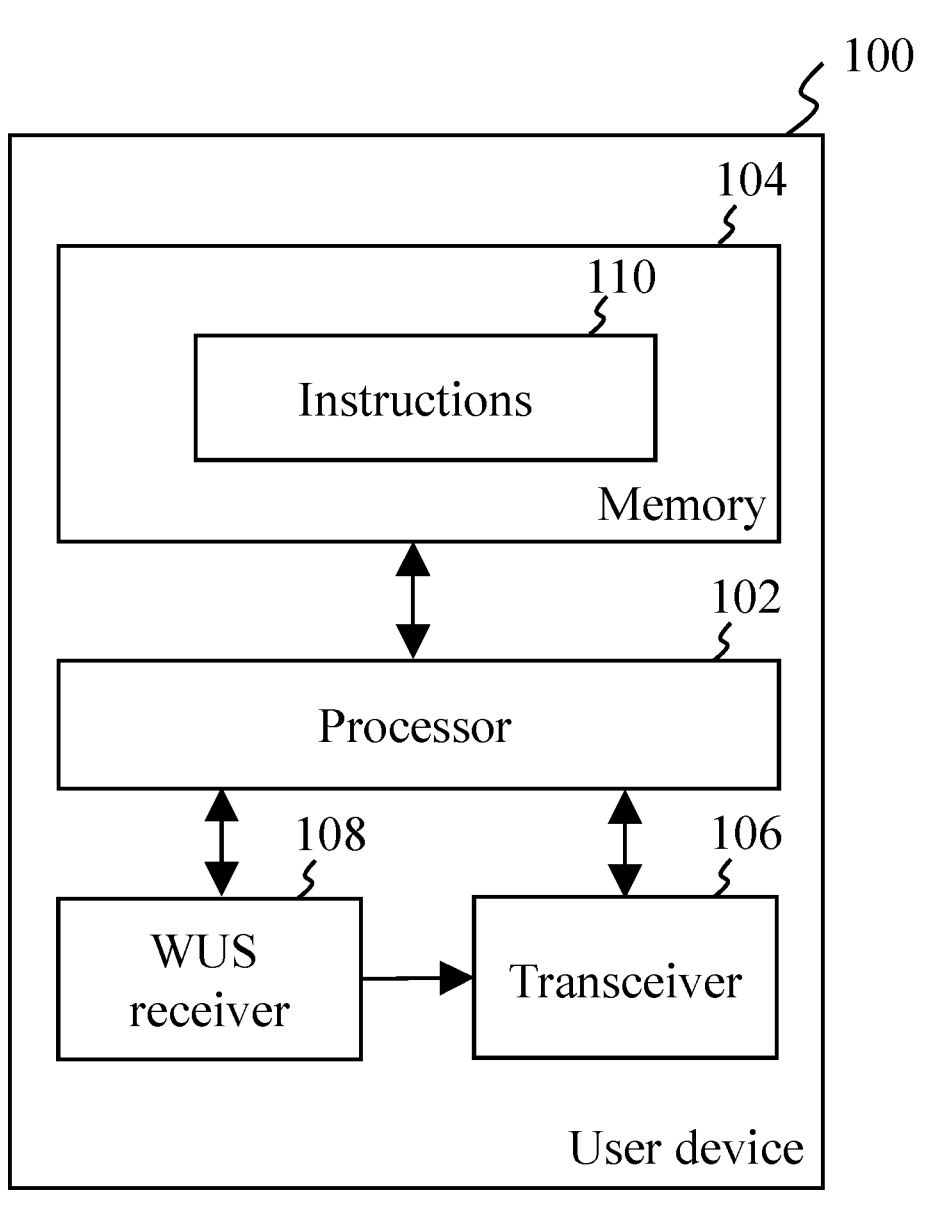
FIG. 1 shows a block diagram of a user device in accordance with one example embodiment.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a user device may refer either to a User Equipment (UE) or any other entity (e.g., Medium Access Control entity) in a wireless communication network. The UE may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication/communication node for a user device in a particular wireless communication network. More specifically, the network node may be used to connect the user device to a Data Network (DN) through a Core Network (CN) and may be referred to as a base transceiver station (BTS) in terms of the 2G communication technology, a NodeB in terms of the 3G communication technology, an evolved NodeB (eNodeB or eNB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (e.g., at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (e.g., a home). Correspondingly, the network node serving the macrocell may be referred to as a macro node, the network node serving the microcell may be referred to as a micro node, and so on.

According to the example embodiments disclosed herein, a wireless communication network, in which a user device and a network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

The verb "wake up" and its derivatives used herein relate to a transition of a user device from a sleep state characterized by low power consumption into an active state characterized by high power consumption. The sleep state (herein also referred to as a WUS mode) may refer to any of RRC_IDLE and RRC_INACTIVE in accordance with the Radio Resource Control (RRC) protocol, or to a DRX mode (i.e., sleep mode). As for the active state, it may refer to any of RRC_CONNECTED and a DRX active mode (i.e., wake-up mode). The above-mentioned transition results in turning on an ordinary transceiver responsible for performing the baseband processing of an ordinary communication channel (different from a WUS channel) between the network node and the user device. The transceiver may be represented, for example, by a Baseband Unit (BBU) or a baseband processor that relates to an electronic device (ED) or an ED pool in which the baseband processing is carried out. Some examples of the BBU may include, but not limited to, a modem, a front-end processor, a communication controller, or any other similarly functioning device. In general, the BBU is responsible for digital signal processing and may, for example, execute the following functions: digital intermediate frequency (IF) to baseband conversion/digital baseband to IF conversion, modulation/demodulation, constellation mapping/demapping, scrambling/descrambling, and/or encoding/decoding.

As used in the example embodiments disclosed herein, a Wake-Up Signal (WUS) may relate to a wireless signal having encoded thereon instructions for a user device or a set of user devices either to wake up or continue being in the sleep state. Being instructed to be woken up, a user device, i.e., the transceiver included therein, starts processing the ordinary communication channel between the network node and the user device. Correspondingly, the WUS is generated and transmitted by a network node, and then received by the user device. The WUS is only transmitted when the network node wants the user device to wake up, e.g., to page the user device.

In general, the existing waking-up procedure is based on using a separate low-power WUS receiver at a user device. The WUS receiver is assumed to be configured to monitor a dedicated communication channel for any one or more WUSs from any one or more network nodes. For this reason, the WUS receiver should operate in an always 'ON' manner with very low power consumption. It is also assumed that the ordinary transceiver of the user device may be in a sleep state (or even powered off) for power saving and be activated only the WUS receiver receives a WUS from a network node. In response to the WUS, the WUS receiver may trigger the wake-up of the transceiver, whereupon intensive data exchange between the network node and the user device may start.

It should also be noted that there is a tradeoff between the power consumption and Radio Frequency (RF) sensitivity (i.e., coverage) of the WUS receiver, and that the WUS receiver sensitivity is usually significantly worse than a main receiver (e.g., included in the transceiver) of the user device. For example, according to the 3GPP (see RWS-210168), for the main receiver in NR RRC_IDLE state an RF sensitivity of −100 dBm is associated with an average power consumption of 30-50 mW. Typically, the main receiver can operate at around −120 dBm. As for the WUS receiver, an RF sensitivity of −70/80 dBm is associated with an average power consumption of 7.4 nW. This means 100× power saving with some sensitivity degradation.

As also defined in the 3GPP (see TS 36.304 V17.0.0 section 7.4 a), a WUS-based paging procedure is performed as follows: a WUS is sent by a network node towards a user device only in the cell in which the user device most recently entered RRC_IDLE state. This cell is defined as the cell in which the user device received: RRCEarlyDataComplete message, RRCConnectionRelease message not including noLastCellUpdate, or a RRCConnectionRelease message including noLastCellUpdate (and the user device was using a gentle WUS (GWU) in this cell prior to this RRC connection attempt). Thus, if the UE, while being in RRC_IDLE state, reselects from the last cell to another cell, then it shall not assume to be paged with the WUS. This is because there is currently no waking-up signaling support in inter-cell mobility scenarios. Therefore, the user device will have to switch back to the main receiver after the cell reselection, hence increasing its power consumption.

Given the above, a simple and power-efficient procedure is needed to allow using wake-up signaling in inter-cell mobility scenarios, i.e., when a user device moves from one cell to another while being in the sleep state. From the user device's side, maintaining the sleep state during/after cell reselection requires that the user device can discover the presence of a neighboring cell and evaluate that it is still within a WUS coverage in the neighboring cell using its WUS receiver. This in turns means that the user device can evaluate, by using the WUS receiver, that the RX quality/level of the reselected neighboring cell is sufficiently good. Since a WUS is only transmitted when a network node wants the user device to wake up, then the WUS cannot be used to evaluate the cell quality or if a cell reselection shall be done. Instead, the present authors have suggested using a WUS beacon representing a signal that may be transmitted periodically in each cell, and the WUS beacon may therefore be tracked and evaluated by the user device (with the aid of the WUS receiver) to do cell reselection in the sleep state (e.g., RRC_IDLE), if required. It should be noted that the WUS beacon does not necessarily wake up the user device.

More specifically, the above-proposed procedure is based on configuring a WUS Beacon Occasion (WBO) for each Tracking Area (TA) allocated to the user device. In the WBO, a WUS beacon corresponding to each cell in TA is transmitted once at a cell-specific time offset (i.e., a WUS beacon index) within a time window spanning the WBO. The WBO is also configured together with a mapping table that maps each of the cell-specific time offsets to cell-specific information. The cell-specific information may comprise a cell ID and/or an indicator of a cell-specific frequency and/or cell-specific frequency range to be used by the user device to search for a synchronization signal in a reselected cell. This indicator may be represented by a Global Synchronisation Channel Number (GSCN). Each TA allocated to the user device comprises a set of intra-frequency cells only; in this case, there is no need for the user device to make any frequency tuning when doing cell reselection in the TA, which also helps the user device additionally reduce its power consumption. The WBOs are proposed to be common for all the intra-frequency cells within the TA, but unique for neighbouring TAs.

FIG. 1 shows a block diagram of a user device 100 in accordance with one example embodiment. The user device 100 is intended to communicate with one or more network nodes (e.g., gNBs) in any of the above-described wireless communication networks. The user device 100 may be implemented as any of the above-described UEs. As shown in FIG. 1, the user device 100 comprises a processor 102, a memory 104, a transceiver 106, and a WUS receiver 108. The memory 104 stores processor-executable instructions 110 which, when executed by the processor 102, cause the processor 102 to perform the aspects of the present disclosure, as will be described below in more detail. It should be noted that the number, arrangement, and interconnection of the constructive elements constituting the user device 100, which are shown in FIG. 1, are not intended to be any limitation of the present disclosure, but merely used to provide a general idea of how the constructive elements may be implemented within the user device 100. For example, the processor 102 may be replaced with several processors, as well as the memory 104 may be replaced with several removable and/or fixed storage devices, depending on particular applications. Furthermore, in some embodiments, the transceiver 106 may be implemented as two individual devices, with one for a receiving operation and another for a transmitting operation. Irrespective of its implementation, the transceiver 106 is intended to be capable of performing different operations required to perform the data reception and transmission, such, for example, as signal modulation/demodulation, encoding/decoding, etc. As for the WUS receiver 108, it is assumed to able to monitor one or more dedicated channels which are used in the network to transmit WUSs and WUS beacons from the network nodes to the user device 100.

The processor 102 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 102 may be implemented as any combination of one or more of the aforesaid. As an example, the processor 102 may be a combination of two or more microprocessors.

The memory 104 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 110 stored in the memory 104 may be configured as a computer-executable program code which causes the processor 102 to perform the aspects of the present disclosure. The computer-executable program code for carrying out operations or steps for the aspects of the present disclosure may be written in any combination of one or more programming languages, such as Java, C++, or the like. In some examples, the computer-executable program code may be in the form of a high-level language or in a pre-compiled form and be generated by an interpreter (also pre-stored in the memory 104) on the fly.

FIG. 2 shows a flowchart of a method 200 for operating the user device 100 in accordance with one example embodiment. The method 200 starts with a step S202, in which the processor 102 causes the transceiver 106 to receive, from a network node, a WBO configuration for a current TA. The WBO configuration may be received in the step S202 when the user device 102 is in an active state (i.e., when the transceiver 106 is on), such as RRC_CONNECTED state (i.e., the WBO configuration may be provided via dedicated RRC signaling). At the same time, the WBO configuration may be received in the step S202 as part of System Information Block (SIB) information when the user device 100 is in RRC_IDLE state. The current TA comprises a set of intra-frequency cells each having an ID (e.g., Physical Cell ID (PCI)). The current TA may be represented by a RAN Notification Area (RNA). The WBO configuration comprises a periodicity of a WBO, a set of WUS beacons within the WBO, and a mapping table. Each WUS beacon of the set of WUS beacons has a cell-specific time offset within the WBO. The mapping table maps each of the cell-specific time offsets to the ID of one cell of the set of intra-frequency cells of the current TA. After that, when the user device 100 is in the sleep state in the current TA, the method 200 goes on to a step S204, in which the processor 102 causes the WUS receiver 108 to monitor a RX level and/or RX quality of each WUS beacon of the set of WUS beacons in the current TA. Next, the method 200 proceeds to a step S206, in which the processor 102 uses the monitored RX levels and/or RX qualities to determine whether the user device 100 is within the current TA and whether to switch between different WUS beacons of the set of WUS beacons in the current TA, while remaining in the sleep state. In general, as the user device 100 moves between cells in the current TA, it may switch between different WUS beacons in the WBO. In other words, the processor 102 may perform switching from one WUS beacon to another when it determines that there is a better (in terms of the RX level and/or quality) WUS beacon in the WBO.

In one embodiment, the mapping table may also be extended with an indicator of a cell-specific frequency and/or cell-specific frequency range, such as a GSCN, so that the user device 100 knows at which frequency to find a SSB of a cell when switching from the sleep state (when only the WUS receiver 108 is on) to the active state. More specifically, the GSCN allows the user device 100 to set its RX LO to a correct frequency immediately and only receive the bandwidth (BW) of the SSB. At the same time, it should be noted that the GSCN or any other indicator of a cell-specific frequency and/or cell-specific frequency range is not necessary. If there is no GSCN included in the mapping table, the user device 100 may simply search across a larger BW to find the SSB, but this, of course, lead to an increase the time required to find the SSB and, consequently, an increase in its power consumption.

In one embodiment, if the processor 102 determines, in the step S206, that the RX level monitored for each WUS beacon of the set of WUS beacons in the current TA is less than a threshold and/or the RX quality for each WUS beacon of the set of WUS beacons in the current TA is less than a threshold, the processor 102 may detect that the user device 100 is beyond the current TA. Then, the processor 102 turns on the transceiver 106 to do cell reselection in a new TA which, similar to the current TA, comprises a set of intra-frequency cells each having an ID. After that, the processor 102 may perform the steps S202-S206 from the beginning but now for the new TA (in this case, the user node 100 may be provided with a new WBO from another network node).

Figure 3:
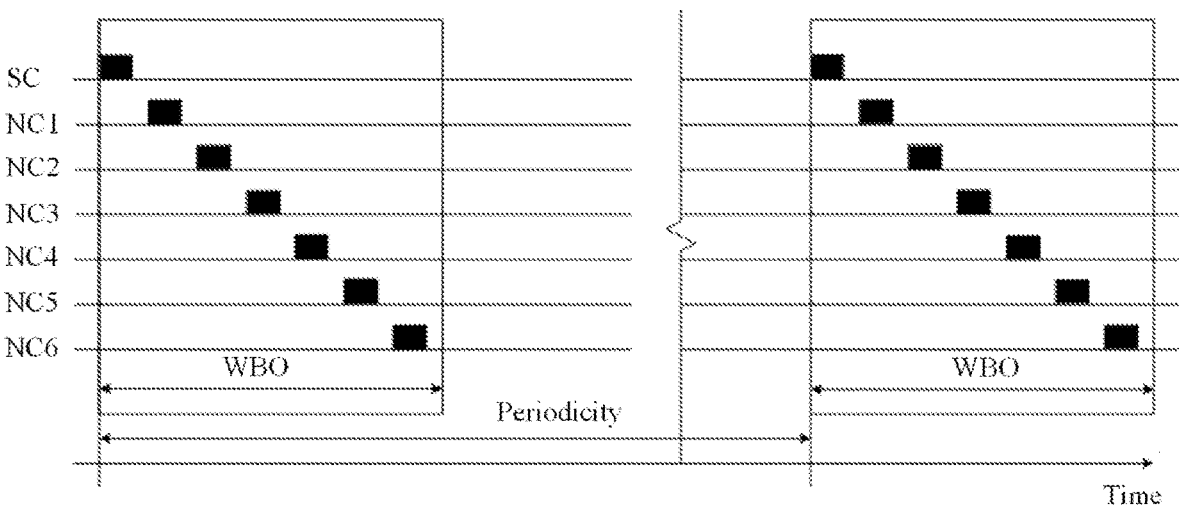
FIG. 3 shows a schematic structure of Wake-Up Signal (WUS) Beacon Occasion (WBO) in accordance with one example embodiment.

FIG. 3 shows a schematic structure of a WBO in accordance with one example embodiment. All WUS beacons (schematically shown as small black rectangles in FIG. 3) from different cells (i.e., a Serving Cell (SC) and six Neighbouring Cells (NCs)) are transmitted at the same subcarrier frequencies inside the same WBO. The user device 100 may evaluate if it is able to receive any WUS beacon from any cell by monitoring the time window spanning the whole WBO without making any frequency changes. It should be noted that the WUS receiver 108 of the user device 100 may also sleep between WBO periods. In some embodiments, the WUS receiver 108 may sleep for multiple WBO periods as long as it has a good reception quality and is able to maintain timing alignment. The WUS receiver 108 does however need to wake up and listen for WUSs at other occasions configured for the WUSs, but this is beyond the scope of the present disclosure.

The configuration of the WBO may be given as part of a SIB (e.g., SystemInformationBlockType2) or in dedicated signaling (e.g., RRC messages), or it may be given as part of signaling involved in the Registration request procedure (e.g., see 3GPP TS 23.502 "Procedures for the 5G System (5GS)"). The WBO configuration may also include at least one of: allocated subcarriers; a symbol offset, slot offset and frame offset; a symbol duration, slot duration and frame duration; and a frame periodicity. The allocated subcarriers may allow the user device 100 to find the frequency location of each WUS beacon, and at least a center frequency is needed to tune the WUR receiver 108. The symbol offset, slot offset and frame offset may allow the user device 100 to find the time position of the WBO relative to the frame timing of the network node which provided the WBO to the user device 100. This may allow the user device 100 to know where to find the beacon when switching to the WUS mode and likewise the user device 100 may use this to calculate the frame timing when switching back to the transceiver 106 from the WUS receiver 108.

Since the WUS beacons corresponding to different cells in the current TA are time multiplexed (i.e., provided with different time offsets in the WBO), this allows avoiding the WUS beacons interferes with each other in the current TA. To avoid interference between neighbouring TAs, it is suggested that different WBOs are used, either time shifted and/or frequency shifted. The user device 100 may then detect that it moves outside its current TA, as it will no longer be able to receive any WUS beacon having a sufficient RX level and/or quality within the configured WBO. In this case, the user device 100 may switch back to the active state (i.e., turn on the transceiver 106) and checks if cell reselection to a stronger serving cell is possible. A new WBO configuration may then be acquired from broadcasted system information or via dedicated signaling.

Figure 4:
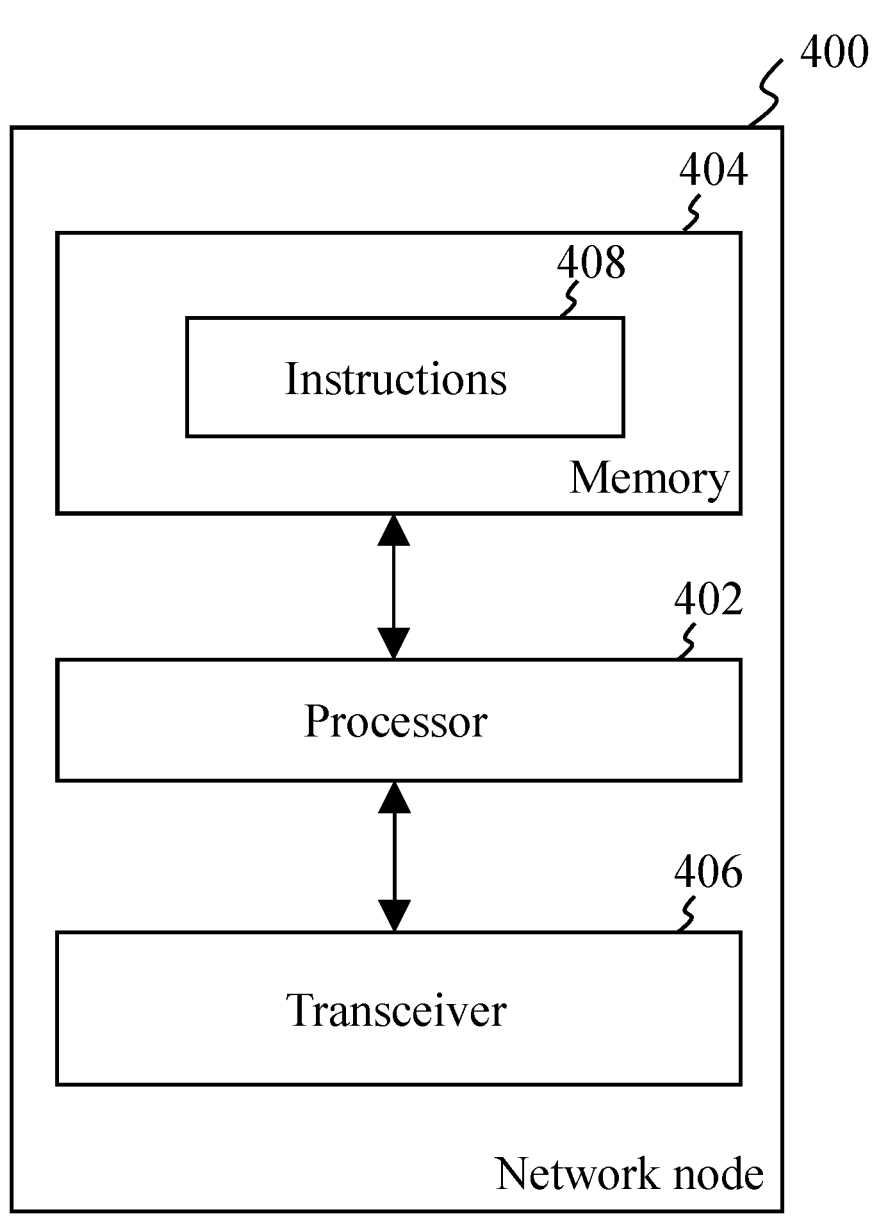
FIG. 4 shows a block diagram of a network node in accordance with one example embodiment.

FIG. 4 shows a block diagram of a network node 400 in accordance with one example embodiment. The network node 400 is intended to communicate with the user device 100 in any of the above-described wireless communication networks. As shown in FIG. 4, the network node 400 comprises a processor 402, a memory 404, and a transceiver 406. The memory 404 stores processor-executable instructions 408 which, when executed by the processor 402, cause the processor 402 to implement the aspects of the present disclosure, as will be described below in more detail. It should be again noted that the number, arrangement, and interconnection of the constructive elements constituting the network node 400, which are shown in FIG. 4, are not intended to be any limitation of the present disclosure, but merely used to provide a general idea of how the constructive elements may be implemented within the network node 400. In general, the processor 402, the memory 404, the transceiver 406, and the processor-executable instructions 408 may be implemented in the same or similar manner as the processor 102, the memory 104, the transceiver 106, and the processor-executable instructions 110, respectively.

FIG. 5 shows a flowchart of a method 500 for operating the network node 400 in accordance with one example embodiment. The method 500 starts with a step S502, in which the processor 402 defines the above-indicated WBO configuration for the current TA allocated to the user device 100. It should be noted that said defining the WBO configuration may imply either its preparation at the network node 400 itself or at any other network entity (e.g., an Access & Mobility Management Function (AMF) entity or Operations and Maintenance (O&M) entity) which may then provide the WBO configuration to the network node 400. After that, the method 500 proceeds to a step S504, in which the processor 402 causes the transceiver 406 to transmit the WBO configuration to the transceiver 106 of the user device 100. If required, the network node 400 may then page the user device 100 with a corresponding WUS beacon of the set of WUS beacons.

Figure 6:
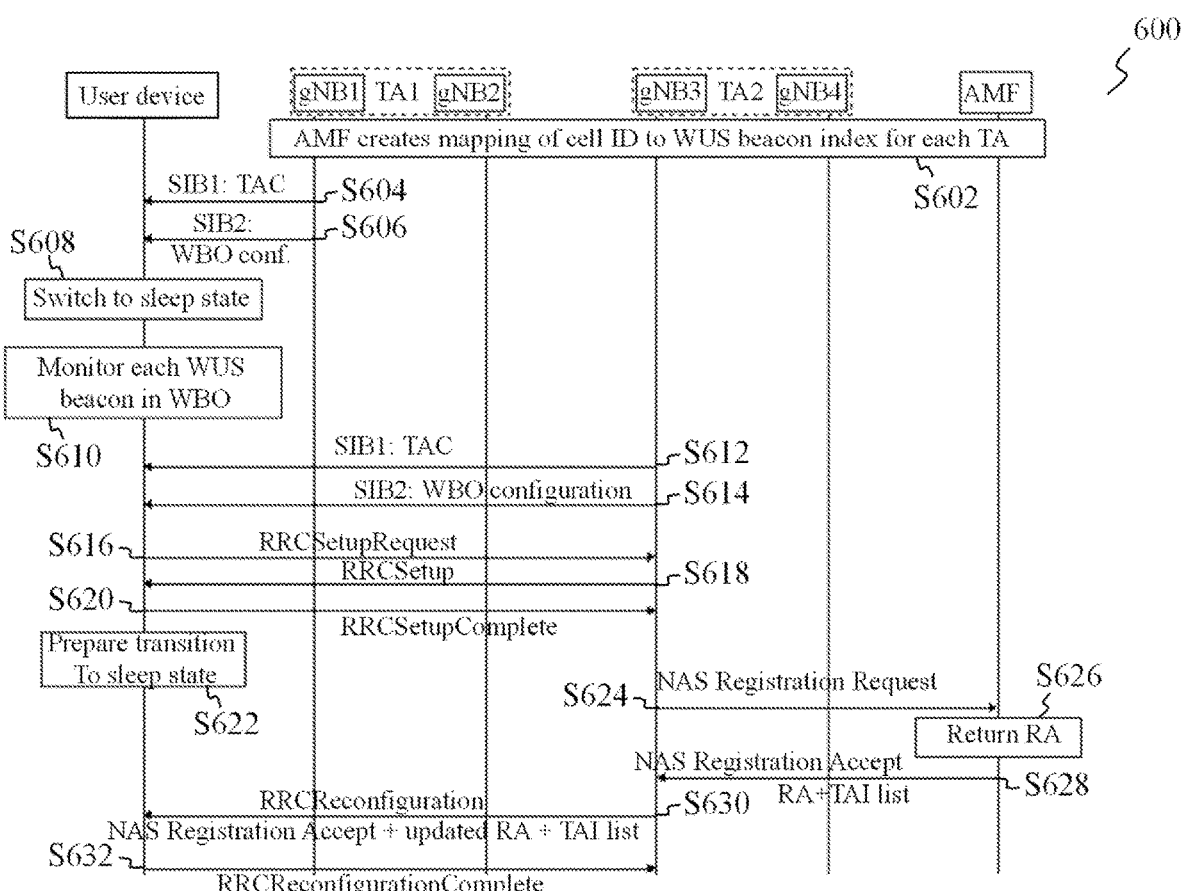
FIG. 6 shows an interaction diagram that explains the interaction between a user device and different network entities to implement waking-up signaling in inter-cell mobility scenarios.

FIG. 6 shows an interaction diagram 600 that explains the interaction between a user device (e.g., UE) and different network entities to implement waking-up signaling in inter-cell mobility scenarios. More specifically, the network entities are represented by four gNBs and an AMF entity. It is assumed that each of the gNBs is implemented as the network node 400, while the user device is implemented as the user device 100. Among the gNBs, gNB1 and gNB2 are arranged in a TA1, while gNB3 and gNB4 are arranged in a TA2.

The interaction diagram 600 starts with a step S602, in which the AMF entity prepares mapping tables and transmits them to each of the gNB1, gNB2, gNB3 and gNB4. Alternatively, these tables may be prepared and delivered by an O&M entity.

Then, the interaction diagram 600 proceeds to steps S604 and S606, in which the user device is assumed to enter RRC_IDLE state (i.e., its transceiver is still on) and receives SIB1 and SIB2 successively from the gNB1. SIB1 comprises a TA Identity (TAI). The user device also acquires a TA Code (TAC) from SIB1 and uses it to derive the TAI of a cell. If the TAI is not included in the list of TAIs of the last registered Registration Area, the user device performs Registration Update to let the network (the AMF entity, for example) know that the user device is moving inside a new Registration Area (RA). As part of the Registration Update, the user device receives a new list of TAIs covering the new RA. As for SIB 2, it comprises a required WBO configuration as well as the corresponding mapping tables. As noted above, each mapping table may be configured to map a WUS beacon index (i.e., its time offset in the WBO) to a PID of a certain cell in the TA1 and a certain GSCN. In particular, the mapping table may comprise the GSCN of each cell in the TA1, and the user device uses the WUS beacon index to find a corresponding GSCN. Together with PCI information, this allows the user device to receive a serving cell SSB without searching for it. It should be noted that when the user device registers with the network, the AMF entity allocates a set of TAs in the List of TAIs to the user device based on various information (e.g., the mobility pattern of the user device).

Further, the interaction diagram 600 goes on to a step S608, in which the user device is now ready to switch OFF its transceiver, i.e., switch from the active state to the sleep state in which only its WUS receiver is used.

In a next step S610, as the user device moves between the cells inside the TA1, the user device will switch between different beacons inside WBO. The user device moves from one beacon to another when it determines that there is a better beacon in the WBO. In case the user device is unable to detect a beacon with sufficient quality (e.g., beacon detection fails too frequently), the user device switches back to the active state, i.e., turns on its transceiver to trigger a cell reselection evaluation. In the signaling diagram 600, it is assumed that the user device finds a better cell belonging to the gNB3, and the user device receives a SIB1 and SIB2 from the gNB3 in next steps S612 and S614, respectively. Again, the UE derives an updated TAI from the SIB1, as well as a new WBO and new mapping tables from the SIB2.

After that, the signaling diagram proceeds to a step S616, in which the user device triggers a RA Update by sending an RRCSetupRequest message to the gNB3, since the TAI of the gNB3 is not in the current RA. In next steps S618 and S620, the user device receives an RRCSetup response from the gNB3 first and then transmits an RRCSetupComplete message comprising an embedded NAS Registration Request to the gNB3. The Embedded NAS Registration Request may have a user device status Information Element (IE) of the Registration Update set to indicate that the user device is about to enter the sleep state in a next step S622. On the network side, this information may be used to reduce the list of TAIs in the RA such that the gNB3 may limit broadcasting a wakeup call to a smaller area. Then, the signaling diagram 600 proceeds to a step S624, in which the NAS Registration Request is forwarded to the AMF entity, including the information about the sleep state transition. In a next step S626, the AMF entity identifies that it is a Registration Update with a user device status IE informing about the sleep state, so it may reduce the list of TAIs in the RA. A NAS Registration Accept message is returned to the gNB3 in a next step S628. After that, the signaling diagram 600 proceeds to steps S630 and S632, in which, respectively, the gNB3 transmits an RRCReconfiguration message with the NAS Registration Accept message to the user device and, in response, the user device confirms this RRCReconfiguration by sending a RRCReconfigurationComplete message to the gNB3.

Figure 7:
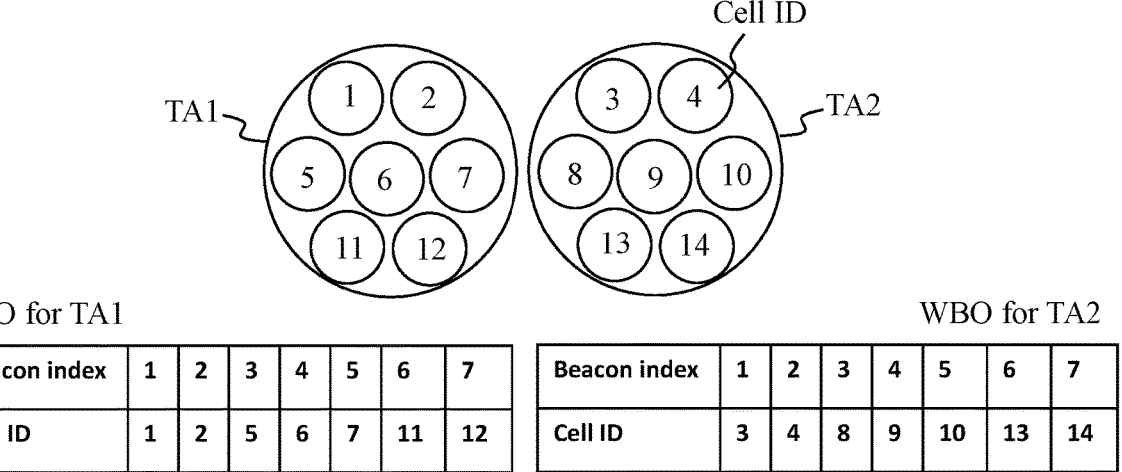
FIG. 7 schematically explains how cells in two neighbouring Tracking Areas (TAs) are mapped to different WBOs by using mapping tables.

FIG. 7 schematically explains how cells in two neighbouring TAs are mapped to different WBOs by using mapping tables. More specifically, the cell IDs of the cells from a TA1 are mapped to the WUS beacon indices (or, in other words, time offsets) in a TA1-associated WBO by using the left mapping table, while the cell IDs of the cells from a TA2 are mapped to the WUS beacon indices (or, in other words, time offsets) in a TA2-associated WBO by using the right mapping table. A user device (like the user device 100) may receive TA1- and TA2-associated WBO configurations in dedicated (e.g., RRC) signaling as part of the RA configuration procedure, as explained earlier with reference to FIG. 6. Each of the TA1- and TA2-associated WBO configurations corresponds to a specific TA (TA1 or TA2) of the RA. This enables the user device to search across the WBOs of different TAs if it is unable to find any WUS beacon of its current TA. If the user device is aware of its mobility pattern, e.g., that it will move from the TA1 to the TA2 (both being part of the RA), because it is on a train/highway, the user device may initiate the search for WUS beacons according to the TA2-associated WBO configuration at a proper time. Alternatively, the user device may attempt to find a WUS beacon belonging to the TA2-associated WBO configuration when it is no longer able to detect the WUS beacons of the TA1-associated WBO configuration.

In one embodiment, if available WBOs are time multiplexed, the AMF a SIB (e.g., SIB2) could provide a cell-optimized WBO in addition to the TA specific WBOs. The cell-optimized WBO would not necessarily include all cells from the current TA, but it could contain cells from multiple TAs. The benefit is that the cell-specific WBO can contain the most relevant neighboring cells to consider even if they are in different TAs. The cell-optimized WBO could comprise multiple non-overlapping time fragments from the TA-specific WBOs in same RA. For each WUS beacon index in the cell-optimized WBO, a corresponding TAI is provided. If the user device fails to detect WUS beacon(s) within the cell-optimized WBO, the user device falls back to the TA-specific WBO, provided also by a SIB (or wake up its transceiver).

In one embodiment, if available WBOs are time multiplexed, a SIB (e.g., SIB2) transmitted by an AMF entity to the user device may indicate a cell-optimized WBO in addition to TA-associated WBOs. The cell-optimized WBO configuration would not necessarily correspond to all cells from the current TA, but it may also correspond to cells from any other TAs. The benefit is that the cell-optimized WBO may indicate the most relevant neighbouring cells to consider even if they are in different TAs. The cell-optimized WBO may comprise multiple non-overlapping time fragments from the TA-associated WBOs in the same RA. For each WUS beacon index in the cell-optimized WBO, a corresponding TAI is provided. If the user device fails to detect the WUS beacon(s) within the cell-optimized WBO, the user device may fall back to the TA-associated WBO.

Let us now give one example of the cell-optimized WBO with reference to FIG. 7. Cell 7 is configured with the WBO for the TA1, which is not fully optimal as the user device should measure a WUS beacon from cell 5 but not from cell 8, although the user device may move to cell 8 more likely. In this case, the cell-optimized WBO for cell 7 may include cells 2, 6, 7, 8, 12 corresponding to WUS beacon occasion indices 2, 4, 5, 7 from the TA1-associated WBO configuration and to WUS beacon index 3 from the TA2-associated WBO configuration (see the mapping tables in FIG. 7). Thus, the cell-optimized WBO may comprise two time fragments from the TA1- and TA2-associated WBOs, namely: [2, 6, 7, 8, 12] for the TA1-associated WBO configuration and [3] for the TA2-associated WBO configuration.

It should be noted that each step or operation of the methods 200 and 500, and the interaction diagram 600, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processor 102 or 402, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. Moreover, the phrase "A and/or B" used in the appended claims should be construed as encompassing the following alternatives: "A only", or "B only", or "A and B". The mere fact that certain measures are recited in mutually different dependent claims does not indicate that a combination of these measures cannot be used to advantage.

The invention claimed is:

1. A user device comprising:
at least one processor; and
at least one memory comprising a computer program code;
wherein the at least one memory and the computer program code are configured to, with the at least one processor, cause the user device at least to:
(a) receive a Wake-Up Signal (WUS) Beacon Occasion (WBO) configuration for a current Tracking Area (TA), the current TA comprising a set of intra-frequency cells each having an ID, and the WBO configuration comprising:
a periodicity of a WBO;

a set of time-multiplexed WUS beacons within the WBO, each WUS beacon of the set of WUS beacons having a cell-specific time offset within the WBO; and
a mapping table that maps each of the cell-specific time offsets to cell-specific information comprising at least the ID of one cell of the set of intra-frequency cells of the current TA;
(b) while the user device is in a sleep state in the current TA in which a wake-up signal receiver remains active and a primary transceiver is deactivated, the sleep state comprising RRC_IDLE or RRC_INACTIVE, monitor a reception (RX) level and/or RX quality of each WUS beacon of the set of WUS beacons in the current TA; and
(c) based on the monitoring in (b): (i) determine that the user device is within the current TA when at least one WUS beacon identified by the mapping table as belonging to the current TA satisfies an RX level and/or RX quality threshold and, upon said determination, maintain the sleep state, select a WUS beacon for tracking, and switch to a different WUS beacon identified by the mapping table as belonging to the current TA when its RX level and/or RX quality exceeds that of a currently tracked WUS beacon; and
(ii) determine that the user device is outside the current TA when no WUS beacon identified by the mapping table as belonging to the current TA satisfies the RX level and/or RX quality threshold, and, in response, initiate operations to acquire a WBO configuration for a new TA.

2. The user device of claim 1, wherein the at least one memory and the computer program code are further configured to, with the at least one processor, cause the user device to:
determine that the RX level monitored for each WUS beacon of the set of WUS beacons in the current TA is less than a threshold, and/or the RX quality monitored for each WUS beacon of the set of WUS beacons in the current TA is less than a threshold;
based on said determination, detect that the user device is outside the current TA; and
perform operations (a)-(c) for a new TA comprising a set of intra-frequency cells each having an ID.

3. The user device of claim 2, wherein the WBO for the new TA is time shifted and/or frequency shifted from the WBO for the current TA.

4. The user device of claim 1, wherein the at least one memory and the computer program code are further configured to, with the at least one processor, cause the user device to: receive, in operation (a), a cell-optimized WBO configuration comprising:
at least one WUS beacon of the set of WUS beacons in the WBO configuration for the current TA; and
at least one WUS beacon of a set of WUS beacons in a WBO configuration for at least one other TA, the at least one WUS beacon of the set of WUS beacons in the WBO configuration for each of the at least one other TA being time shifted from the at least one WUS beacon of the set of WUS beacons in the WBO configuration for the current TA;
monitor, before operations (b) and (c), a RX level and/or RX quality of each WUS beacon in the cell-optimized WBO configuration when the user device is in the sleep state; and
based on the monitored RX level and/or RX quality of each WUS beacon in the cell-optimized WBO configuration, decide whether to switch between different WUS beacons in the cell-optimized WBO configuration or to perform operations (b) and (c).

5. The user device of claim 1, wherein the mapping table further maps each of the cell-specific time offsets to an indicator of a cell-specific frequency and/or cell-specific frequency range to be used by the user device to search for a synchronization signal.

6. The user device of claim 5, wherein the indicator of the cell-specific frequency and/or cell-specific frequency range is configured as a Global Synchronization Channel Number (GSCN).

7. The user device of claim 1, wherein the WBO configuration further comprises, for the set of WUS beacons:
an allocated subcarrier;
a symbol offset, a slot offset and a frame offset;
a symbol duration, a slot duration and a frame duration; and
a frame periodicity.

8. A network node comprising:
at least one processor; and
at least one memory comprising a computer program code;
wherein the at least one memory and the computer program code are configured to, with the at least one processor, cause the network node at least to:
(a) define a Wake-Up Signal (WUS) Beacon Occasion (WBO) configuration for a current Tracking Area (TA) of a user device, the current TA comprising a set of intra-frequency cells each having an ID, and the WBO configuration comprising:
a periodicity of a WBO;
a set of WUS beacons within the WBO, each WUS beacon of the set of WUS beacons having a cell-specific time offset within the WBO; and
a mapping table that maps each of the cell-specific time offsets to the ID of one cell of the set of intra-frequency cells of the current TA; and
(b) transmit the WBO configuration to the user device,
wherein the at least one memory and the computer program code are further configured to, with the at least one processor, cause the network node to:
define, in operation (a), a cell-optimized WBO configuration comprising:
at least one WUS beacon of the set of WUS beacons in the WBO configuration for the current TA; and
at least one WUS beacon of the set of WUS beacons in a WBO configuration for at least one other TA, the at least one WUS beacon of the set of WUS beacons in the WBO configuration for each of the at least one other TA being time shifted from the at least one WUS beacon of the set of WUS beacons in the WBO configuration for the current TA; and transmit, in operation (b), the cell-optimized WBO configuration to the user device,
wherein the mapping table further maps each of the cell-specific time offsets to an indicator of a cell-specific frequency and/or cell-specific frequency range to be used by the user device to search for a synchronization signal,
wherein the indicator of the cell-specific frequency and/or cell-specific frequency range is configured as a Global Synchronization Channel Number (GSCN),
wherein the WBO configuration further comprises, for the set of WUS beacons:
an allocated subcarrier;
a symbol offset, a slot offset and a frame offset;
a symbol duration, a slot duration and a frame duration; and a frame periodicity
wherein the set of WUS beacons within the WBO are transmitted on a same frequency and in mutually non-overlapping time positions within the WBO
wherein the mapping table specifies, for each intra-occasion beacon index, a corresponding cell ID,
wherein the network node transmits the WBO configuration as system information (SIB) and/or via dedicated RRC signaling, and
wherein WBOs associated with different TAs of a same Registration Area are defined such that their time windows are non-overlapping and/or frequency-shifted with respect to one another.

9. A method for operating a user device, comprising:
(a) receiving a Wake-Up Signal (WUS) Beacon Occasion (WBO) configuration for a current Tracking Area (TA), the current TA comprising a set of intra-frequency cells each having an ID, and the WBO configuration comprising:
a periodicity of a WBO;
a set of time-multiplexed WUS beacons within the WBO, each WUS beacon of the set of WUS beacons having a cell-specific time offset within the WBO; and
a mapping table that maps each of the cell-specific time offsets to cell-specific information comprising at least the ID of one cell of the set of intra-frequency cells of the current TA;
(b) while the user device is in a sleep state in the current TA in which a wake-up signal receiver remains active and a primary transceiver is deactivated, the sleep state comprising RRC_IDLE or RRC_INACTIVE, monitoring a reception (RX) level and/or RX quality of each WUS beacon of the set of WUS beacons in the current TA; and
(c)) based on the monitoring in (b): (i) determining that the user device is within the current TA when at least one WUS beacon identified by the mapping table as belonging to the current TA satisfies an RX level and/or RX quality threshold, and, upon said determination, maintaining the sleep state, selecting a WUS beacon for tracking, and switching to a different WUS beacon identified by the mapping table as belonging to the current TA when its RX level and/or RX quality exceeds that of a currently tracked WUS beacon; and (ii) determining that the user device is outside the current TA when no WUS beacon identified by the mapping table as belonging to the current TA satisfies the RX level and/or RX quality threshold, and, in response, initiating operations to acquire a WBO configuration for a new TA.

10. The method of claim 9, wherein monitoring in (b) comprises monitoring within a time window during the WBO without changing a receiver frequency, and wherein the set of WUS beacons within the WBO are transmitted on a same frequency in mutually non-overlapping time positions to avoid intra-TA interference while the user device monitors in the sleep state.

11. The method of claim 9, wherein switching to a different WUS beacon comprises maintaining the primary transceiver deactivated and selecting the different WUS beacon whose RX level and/or RX quality is better than that of a currently used WUS beacon without changing a receiver frequency during the WBO.

12. The method of claim 9, wherein determining that the user device is outside the current TA comprises determining that the user device is no longer able to receive any WUS beacon with a sufficient RX level and/or RX quality within the configured WBO and, in response, turning on a primary transceiver, obtaining a WBO configuration for a new TA via broadcast system information or dedicated signaling, and thereafter returning the user device to a sleep state.

13. The method of claim 9, wherein the user device uses the mapping table that maps each WUS beacon's cell-specific time offset to a cell ID to identify whether a WUS beacon belongs to the current TA when performing the determinations in (c), and, when the user device is unable to detect a WUS beacon of the current TA, attempts to find a WUS beacon belonging to a WBO configuration associated with a neighboring TA of a same Registration Area using mapping tables for different TAs.

14. The method of claim 9, wherein the user device deactivates a wake-up signal receiver between WBO periods and, when timing alignment is maintained, sleeps for multiple WBO periods before re-activating to monitor a subsequent WBO.

15. The method of claim 9, wherein the user device determines a time position of each WUS beacon from a symbol offset, a slot offset, and a frame offset in the WBO configuration and schedules monitoring accordingly.

16. The method of claim 9, wherein the user device retrieves, from the mapping table, an indicator of a cell-specific frequency and/or cell-specific frequency range configured as a Global Synchronization Channel Number (GSCN) and searches for a synchronization signal based on the indicator.

*   *   *   *   *